United States Patent
Uchida

(10) Patent No.: US 8,313,803 B2
(45) Date of Patent: Nov. 20, 2012

(54) SPIN COATING METHOD

(75) Inventor: Shinji Uchida, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 427 days.

(21) Appl. No.: 12/591,095

(22) Filed: Nov. 6, 2009

(65) Prior Publication Data

US 2010/0112210 A1    May 6, 2010

(30) Foreign Application Priority Data

Nov. 6, 2008    (JP) .................... 2008-285608

(51) Int. Cl.
*B05D 1/26*    (2006.01)
*B05D 3/12*    (2006.01)

(52) U.S. Cl. .......... 427/240; 427/425; 427/427.3; 427/427.4; 118/52; 118/320; 118/321; 118/323

(58) Field of Classification Search .......... 427/240, 427/425, 427.3, 427.4; 118/52, 320, 321, 118/323
See application file for complete search history.

(56) References Cited

U.S. PATENT DOCUMENTS

| 5,980,985 | A  | * | 11/1999 | Kikuchi | ............ | 427/240 |
| 6,312,781 | B1 |   | 11/2001 | Kikuchi |   |   |
| 7,343,857 | B2 |   | 3/2008  | Sakuarai et al. |   |   |
| 2005/0058775 | A1 |   | 3/2005 | Oku et al. |   |   |
| 2005/0271819 | A1 | * | 12/2005 | Wago et al. | ............ | 427/259 |
| 2005/0284320 | A1 |   | 12/2005 | Sakuarai et al. |   |   |
| 2009/0285982 | A1 | * | 11/2009 | Mori et al. | ............ | 427/162 |

FOREIGN PATENT DOCUMENTS

| JP | 03-192518 | A | 8/1991 |
| JP | 10-249264 | A | 9/1998 |
| JP | 10-320850 | A | 12/1998 |
| JP | 2002-269860 | A | 9/2002 |
| JP | 2005-046694 | A | 2/2005 |
| JP | 2005-108351 | A | 4/2005 |

* cited by examiner

*Primary Examiner* — Kirsten Jolley
(74) *Attorney, Agent, or Firm* — Rabin & Berdo, P.C.

(57) ABSTRACT

Spin coating method for a recording medium having a hole in the center, including moving a tip of a feeding nozzle to an initial position at a distance X above a recording surface and a distance A radially apart from a periphery of the hole, feeding a coating liquid onto the recording surface for a predetermined period of time while rotating the recording medium at a predetermined speed, and moving the tip from the initial position along a radial direction towards an outer periphery of the recording medium while keeping the tip above the recording surface at the distance X. X satisfies $X \leq 2 [3 r \gamma/(2 g C)]^{1/3}$, where $\gamma$ and C respectively are surface tension and density of the coating liquid, r is the outer radius of the feeding nozzle, and g is the acceleration of gravity. A satisfies $A \geq r + X/3$.

2 Claims, 10 Drawing Sheets

Fig. 4

|  | step 1 | step 2 | step 3 | step 4 | step 5 | step 6 | step 7 | step 8 | step 9 | step 10 |
|---|---|---|---|---|---|---|---|---|---|---|
| time (sec) | 0 | - | 1 | - | 5 | - | 6 | 26 | - | 27 |
| rotating speed (rpm) | 0 | 0 → 250 | 250 | 250 | 250 | 250→3,000 | 3,000 | 3,000 | 3,000 → 0 | 0 |
| nozzle position | (*1) | (*2) | (*3) | (*4) | (*5) | (*6) | (*7) | (*8) | (*9) | (*10) |
| resist discharge | OFF | OFF | ON | ON | OFF | OFF | OFF | OFF | OFF | OFF |

(*1)   waiting position (*2)   moving to radial inwards (*3)   at 1 mm from inner periphery (*4)   moving from inner to outer periphery (*5)   at 1 mm from outer periphery (*6)   moving to waiting position (*7)   waiting position (*8)   waiting position (*9)   waiting position (*10)  waiting position

Fig. 6

| No. | nozzle tip outer diameter | distance A (*A) | distance X (*X) | results |
|---|---|---|---|---|
| 1 | 0.30 mm | 1.0 mm | 0.6 mm | ○: coating film with uniform thickness in the area radially outer than 0.65 mm from inner peripheral edge |
| 2 | 0.30 mm | 0.6 mm | 0.6 mm | ○: coating film with uniform thickness in the area radially outer than 0.25 mm from inner peripheral edge |
| 3 | 0.30 mm | 0.4 mm | 0.6 mm | ○: coating film with uniform thickness in the area radially outer than 0.05 mm from inner peripheral edge |
| 4 | 0.30 mm | 0.3 mm | 0.6 mm | X: coating liquid scattered to inner peripheral edge; uneven coating film |
| 5 | 0.30 mm | 0.5 mm | 0.8 mm | ○: coating film with uniform thickness in the area radially outer than 0.08 mm from inner peripheral edge |
| 6 | 0.30 mm | 0.5 mm | 1.2 mm | X: coating liquid scattered to inner peripheral edge; uneven coating film |
| 7 | 0.30 mm | 0.8 mm | 1.2 mm | ○: coating film with uniform thickness in the area radially outer than 0.25 mm from inner peripheral edge |
| 8 | 0.30 mm | 0.8 mm | 1.4 mm | ○: coating film with uniform thickness in the area radially outer than 0.18 mm from inner peripheral edge |
| 9 | 0.30 mm | 0.8 mm | 1.6 mm | X: coating liquid scattered to inner peripheral edge; uneven coating film (Out of the range to avoid falling down of a droplet mentioned in [0043]) |

(*A) radial distance A between the edge of the center hole of the disk substrate and the center of the nozzle
(*X) vertical distance X between the substrate surface and the tip of the nozzle
○: good, acceptable,  X: bad, unacceptable

Fig. 6 (continued)

| No. | nozzle tip outer diameter | distance A (*A) | distance X (*X) | results |
|---|---|---|---|---|
| 10 | 0.51 mm | 1.0 mm | 0.6 mm | ○: coating film with uniform thickness in the area radially outer than 0.55 mm from inner peripheral edge |
| 11 | 0.51 mm | 0.6 mm | 0.6 mm | ○: coating film with uniform thickness in the area radially outer than 0.15 mm from inner peripheral edge |
| 12 | 0.51 mm | 0.5 mm | 0.6 mm | ○: coating film with uniform thickness in the area radially outer than 0.05 mm from inner peripheral edge |
| 13 | 0.51 mm | 0.4 mm | 0.6 mm | X: coating liquid scattered to inner peripheral edge; uneven coating film |
| 14 | 0.51 mm | 0.3 mm | 0.6 mm | X: coating liquid scattered to inner peripheral edge; uneven coating film |
| 15 | 0.51 mm | 1.0 mm | 0.8 mm | ○: coating film with uniform thickness in the area radially outer than 0.48 mm from inner peripheral edge |
| 16 | 0.51 mm | 0.6 mm | 0.8 mm | ○: coating film with uniform thickness in the area radially outer than 0.08 mm from inner peripheral edge |
| 17 | 0.51 mm | 0.5 mm | 0.8 mm | X: coating liquid scattered to inner peripheral edge; uneven coating film |
| 18 | 0.51 mm | 0.4 mm | 0.8 mm | X: coating liquid scattered to inner peripheral edge; uneven coating film |
| 19 | 0.51 mm | 1.0 mm | 1.5 mm | ○: coating film with uniform thickness in the area radially outer than 0.25 mm from inner peripheral edge |
| 20 | 0.51 mm | 1.0 mm | 1.7 mm | ○: coating film with uniform thickness in the area radially outer than 0.18 mm from inner peripheral edge |
| 21 | 0.51 mm | 1.0 mm | 1.9 mm | X: coating liquid scattered to inner peripheral edge; uneven coating film (Out of the range to avoid falling down of a droplet mentioned in [0043]) |

(*A) radial distance A between the edge of the center hole of the disk substrate and the center of the nozzle
(*X) vertical distance X between the substrate surface and the tip of the nozzle
○: good, acceptable,   X: bad, unacceptable

JUST AFTER RESIST APPLICATION

CONFIGURATION AFTER REMOVAL OF ROTARY DISK

SPIN COATING METHOD

CROSS-REFERENCE TO RELATED APPLICATION

This application is based on, and claims priority to, Japanese Patent Application No. 2008-285608, filed on Nov. 6, 2008, contents of which are incorporated herein by reference.

BACKGROUND OF THE INVENTION

1. Field of the Invention

The present invention relates to a spin-coating method for applying a coating liquid fed through a feed nozzle on a recording surface to form a coating layer, and a spin-coating apparatus including a control device.

2. Description of the Related Art

With increase in recording density of a magnetic recording medium, some proposals have been disclosed. In order to avoid a problem of superfluous recording called "side fringe", a magnetic recording medium of a discrete track structure is disclosed in which a groove is provided between adjacent recording tracks. For the purpose of attaining enhanced recording density, Japanese Unexamined Patent Application Publication No. 2005-108351 discloses a patterned medium in which dots are formed on a disk, each dot being one bit of record.

Utilization of a nano-imprinting technique in the manufacturing process of such magnetic recording media has been proposed in Japanese Unexamined Patent Application Publication No. 2005-108351, for example. An imprinting apparatus for use in manufacturing a magnetic recording medium utilizing the nano-imprinting technique comprises, as shown in this patent application publication, main components of a press bottom board having a plate for mounting a substrate with a resist film, and a press top board allowing the approach to or departure from the press bottom board and having a disk-shaped stamper with a pattern of protrusions and recesses representing recording data in the central part thereof. In this structure of an imprinting apparatus, the stamper is pressed onto a resist film or a polymer layer formed on a recording surface of a magnetic recording medium, and the pattern of protrusions and recesses is transferred onto the recording surface of the magnetic recording medium.

Such a resist film is formed on a substrate by applying a photoresist uniformly on a magnetic film of the substrate by means of a spin-coating method as disclosed in Japanese Unexamined Patent Application Publication No. H10-249264, for example, and subsequently curing by ultraviolet light irradiation on the photoresist. It is required in the process that the resist film is formed with a uniform thickness over the whole substrate surface.

In order to form a protective film such as the resist film with a uniform thickness over the whole substrate surface, Japanese Unexamined Patent Application Publication No. H10-249264 discloses a technique in which a resin for the protective film is supplied from above the position of the center of rotation of the substrate down to the substrate. A rotary disk covering the center hole of the substrate is allowed to be held on or removed from a center hole of a turn table for mounting the substrate. A resin is fed onto the rotary disk while the rotary disk and the substrate are rotating, to form a protective film of the resin over the whole substrate surface.

The spin-coating method described above involves a problem that a photoresist fed around the periphery of the center hole of the substrate spreads irregularly and splashes on the edge of the center hole causing variation of film thickness in the radial direction. If the photoresist fed through a nozzle is arranged to avoid the splashing on the edge of the hole, that is, when an initial position of the tip of the nozzle is set at a position apart from the hole edge by a certain distance towards the outer peripheral side of the substrate in consideration of scattering and a wet range of the photoresist on the substrate, a film thickness in the center hole side of the substrate inner than the position of the nozzle tip may become extraordinarily thinner than other region of the substrate. Thus, uneven film thickness occurs in the resist film.

In the case a rotary disk covering the center hole of the substrate is provided as proposed in Japanese Unexamined Patent Application Publication No. H10-249264, photoresist is accumulated around the outer periphery of the rotary disk 2 in the resist film 6 formed extending over the outer periphery of the rotary disk 2 and the surface of the substrate 4 as shown in FIG. 7(A). As a result, as shown in FIG. 7(B), after the rotary disk 2 is removed from the center hole of the substrate 4, a thicker portion of the formed resist film 6' than other portion is left at the position corresponding to the outer peripheral surface of the rotary disk 2. This configuration of the resist may cause difficulty in removing in a posterior step.

When the rotational speed of the turntable is raised, a thickness of the resist film on the substrate becomes thin and rather uneven in the region other than the part corresponding to the outer peripheral surface of the rotary disk 2. It has been confirmed that when the rotary disk 2 is composed of a material exhibiting poor wettability with the photoresist, the photoresist accumulates around the outer periphery of the rotary disk 2 and the formed resist film is bulged at the portion corresponding to the outer peripheral surface of the rotary disk 2 relatively to the other portion.

SUMMARY OF THE INVENTION

In view of the above issues, an object of the present invention is to provide a spin-coating method that forms a uniform coating layer over the whole substrate surface without using a rotary disk. Another object of the invention is to provide a spin-coating apparatus including a control device performing such a spin-coating method.

To accomplish the above object, a spin-coating method of the invention comprises: a step of moving the tip of the feeding nozzle, which feeds a coating liquid onto a recording surface of a recording medium substrate having a hole in a center thereof, to an initial position located at a predetermined distance X above the recording surface of the recording medium substrate and at a predetermined distance A radially apart from a periphery of the hole of the recording medium substrate; and a step of feeding the coating liquid for a predetermined period of time through the feeding nozzle onto the recording surface of the recording medium substrate brought to rotation at a predetermined rotating speed, and moving the tip of the feeding nozzle from the initial position along a radial direction towards an outer periphery of the recording medium substrate while keeping the tip of the feeding nozzle above the recording surface with a predetermined distance X; wherein the distance X is set at a value that satisfies an inequality $X \leq 2 [3 r \gamma/(2 g C)]^{1/3}$ wherein $\gamma$ and C being a surface tension and a density of the coating liquid, respectively, r being an outer radius of the feeding nozzle through which the coating liquid is fed, and g being the acceleration of gravity; and the distance A is set at a value satisfying an inequality $A \geq r + X/3$.

A spin coating apparatus of the invention comprises: a substrate-mounting head rotatably supporting and detachably holding a recording medium substrate having a hole in a center thereof; a feeding nozzle for feeding a coating liquid onto a recording surface of the recording medium substrate; a head rotation driving section for rotating the substrate-mounting head; a feeding nozzle holder movably supporting and holding the feeding nozzle; a nozzle holder driving section for moving a tip of the feeding nozzle held by the feeding nozzle holder with respect to a recording surface of the recording medium substrate supported by the substrate-mounting head; a control section causing the head rotation driving section to rotate the substrate-mounting head and causing the nozzle holder driving section to move the tip of the feeding nozzle; wherein the control section moves the tip of the feeding nozzle to an initial position located at a predetermined distance X above the recording surface of the recording medium substrate and at a predetermined distance A radially apart from a periphery of the hole of the recording medium substrate; the control section causes feeding of the coating liquid for a predetermined period of time through the feeding nozzle onto the recording surface of the recording medium substrate brought to rotation at a predetermined rotating speed and causes the tip of the feeding nozzle to move from the initial position along a radial direction towards an outer periphery of the recording medium substrate while keeping the tip of the feeding nozzle above the recording surface with a predetermined distance X; and the control section sets the distance X at a value that satisfies an inequality $X \leq 2 [3 r \gamma/(2 g C)]^{1/3}$ wherein $\gamma$ and C being a surface tension and a density of the coating liquid, respectively, r being an outer radius of the feeding nozzle through which the coating liquid is fed, and g being the acceleration of gravity; and the control section sets the distance A at a value satisfying an inequality $A \geq r + X/3$.

In the spin coating method and the spin coating apparatus of the invention as defined above, a resist of a coating liquid is fed for a predetermined period of time through a feeding nozzle onto the recording surface of the recording medium substrate, and the vertical distance X at the initial position is set at a value that satisfies an inequality $X \geq 2 [3 r \gamma/(2 g C)]^{1/3}$ wherein $\gamma$ and C being a surface tension and a density of the coating liquid, respectively, r being an outer radius of the feeding nozzle through which the coating liquid is fed, and g being the acceleration of gravity; and the radial distance A of the initial position is set at a value satisfying an inequality $A \geq r + X/3$. In these conditions, the coating liquid does not fall down from the tip of the feeding nozzle, and therefore, a coating layer is formed uniformly over the whole surface of the substrate.

BRIEF DESCRIPTION OF THE DRAWINGS

FIG. 4 is a table showing control steps in an embodiment example of the spin-coating method according to the invention;

FIG. 6 is a table showing results of comparative experiments; and

DETAILED DESCRIPTION OF THE INVENTION

Figure 1:
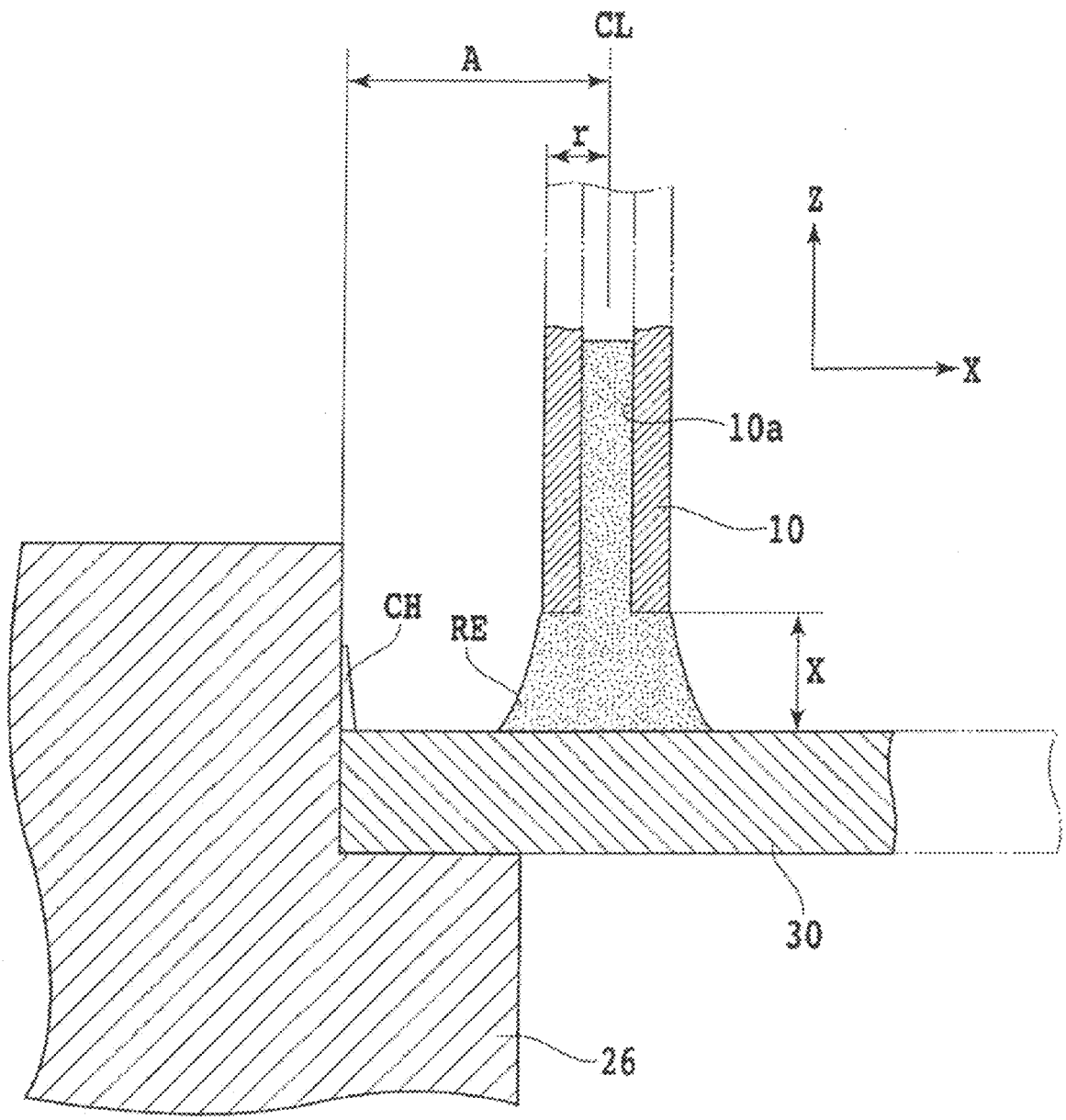
FIG. 1 is an enlarged sectional view of an essential part of a device in an embodiment example of the spin-coating method according to the invention.
Figure 2:
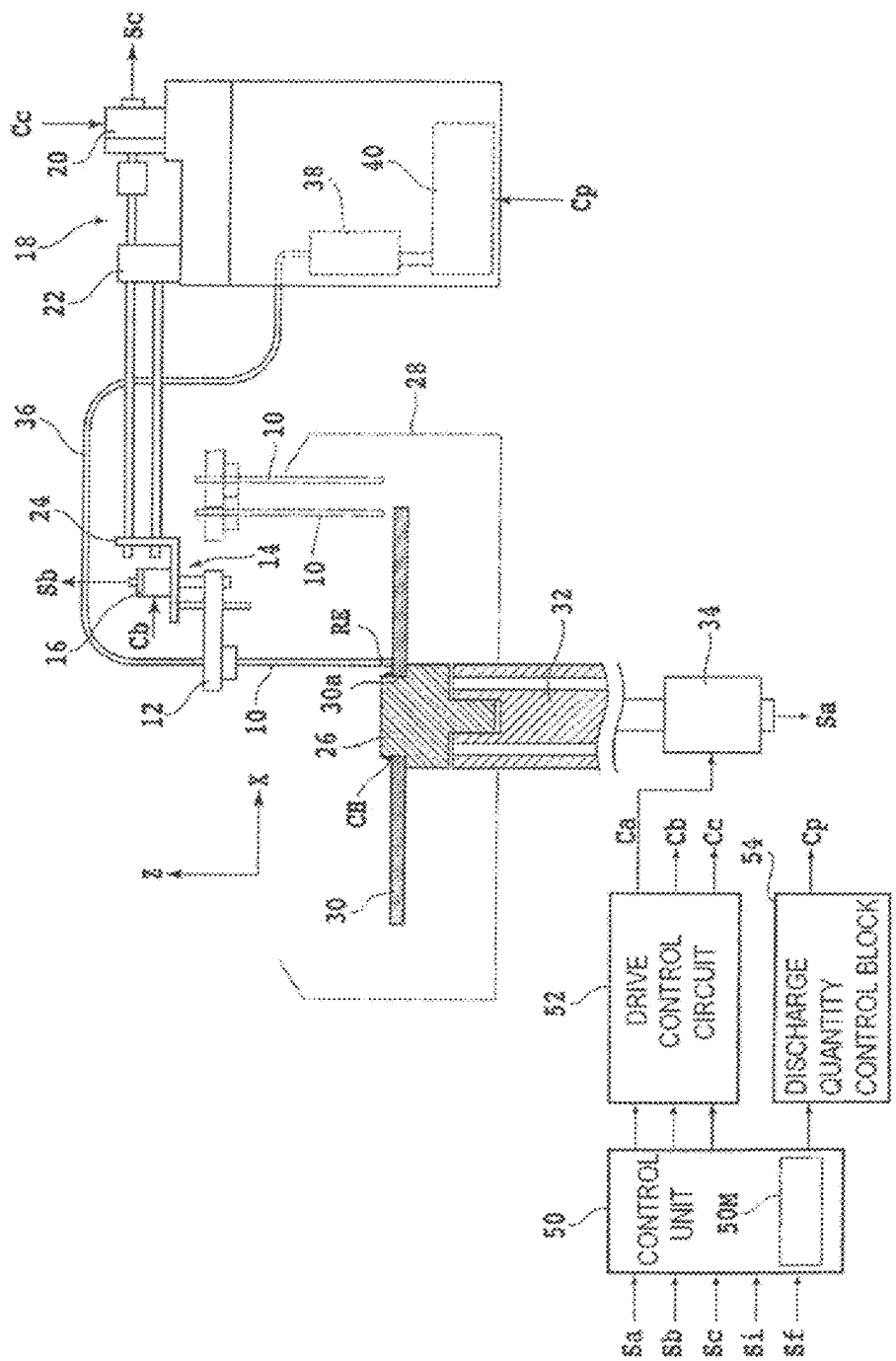
FIG. 2 shows a schematic construction of an example of a spin-coating apparatus according to the invention.

FIG. 1 is an enlarged sectional view of an essential part of a device in an embodiment example of the spin-coating method according to the invention. FIG. 2 shows a schematic construction of a spin-coating apparatus in an embodiment example according to the present invention.

Referring to FIG. 2, a spin-coating apparatus comprises principal components of: a substrate-mounting head 26 disposed rotatably at a central place in a cup 28 of a cylindrical configuration and having a chuck mechanism CH; a drive motor 34 for rotating the substrate-mounting head 26 via a coupling 32; a resist feeding nozzle 10 for leading a resist RE from a resist feeding section towards a recording surface of a recording medium substrate 30; a nozzle holder 12 for holding the resist feeding nozzle 10; a nozzle holder drive and control section for moving a lower end of the resist feeding nozzle 10 held by the nozzle holder 12 to a predetermined position with respect to the recording surface of the recording medium substrate 30; and a resist feeding section for feeding a predetermined amount of resist into the resist feeding nozzle 10.

The recording medium substrate 30 with a predetermined thickness and an annular configuration has a hole 30a in the center thereof Outer and inner diameters are set at 65 mm and 20 mm, respectively. The recording medium substrate 30 is a magnetic recording medium of a hard disk manufactured by a nano-imprinting method, for example. On the recording surface of the recording medium substrate 30, a carbon protective film is formed on which a resist is applied.

The substrate mounting head 26, which has a chuck mechanism CH for holding the recording medium substrate detachably, includes a cylinder portion and a step portion in upper part of the head 26, the cylinder portion being engaged with the hole 30a of the recording medium substrate 30 and the step portion being formed adjacent to the outer periphery of the cylinder portion and receiving the periphery of the hole 30a of the recording medium substrate 30. The chuck mechanism CH includes a pair of clamps disposed at the cylinder portion movably in the radial direction of the substrate 30. The pair of clamps is operated selecting either projecting out radially from the periphery of the hole 30a of the substrate 30 received by the step portion of the substrate mounting head 26, or being pulled into the interior of the cylinder portion of the substrate mounting head 26. When the pair of clamps projects out radially, the substrate 30 is held at the step portion of the substrate mounting head 26; when the pair of clamps is pulled in to the interior of the cylinder portion of the substrate mounting head 26, the substrate 30 is released from the step portion of the substrate mounting head 26 becoming detachable.

The chuck mechanism CH is not limited to the clamp system as described above, and a mechanism is possible as disclosed in Japanese Unexamined Patent Application Publication Nos. 2001-300401 and 2005-296705 in which a plurality of suction holes are formed in the step portion of the substrate mounting head 26 connecting to a vacuum pump that is selectively operated to hold or release the recording medium substrate with an adsorption force of the vacuum.

The lower end of the substrate mounting head 26 is connected to an output shaft of a drive motor 34 via a coupling 32. The drive motor 34 can be a stepping motor provided with a rotary encoder. The output shaft of the drive motor 34 is controlled by a control unit 50 at an appropriate number of revolutions. The control unit 50 controls the number of revolutions of the substrate mounting head 26 with the recording medium substrate 30 mounted thereon at a predetermined value corresponding to a position of the lower end of the resist feeding nozzle 10 with respect to the surface of the substrate of a recoding medium 30.

The resist feeding nozzle 10 is composed of a stainless steel pipe with an outer diameter of 0.51 mm and an inner diameter of 0.25 mm, for example. As shown in the enlarged view of FIG. 1, the tip surface of the resist feeding nozzle 10 opposing the recording surface of the recording medium substrate 30 is sheared perpendicularly to the center line CL of the nozzle 10.

The nozzle holder drive and control section comprises, for example, a vertically driving mechanism 14 for driving the nozzle holder 12 up and down in the direction of the coordinate axis Z in FIG. 2 and a translationally driving mechanism 18 for driving the whole of the vertically driving mechanism 14 in the direction of the coordinate axis X in FIG. 2, which is a radial direction of the recording surface of the recording medium substrate 30.

The vertically driving mechanism 14 comprises principal components of, for example, a drive motor 16, a guide pin, and a bracket. The drive motor 16 has an output shaft connected to a screw part of a ball screw coupled with a nut part for the ball screw provided in an end region of a nozzle holder 12 that holds the center line CL of the resist feeding nozzle 10 in the direction perpendicular to the recording surface of the recording medium substrate 30. The guide pin with the upper end thereof fixed to the bracket passes through the nozzle holder 12 to hinder rotation of the nozzle holder 12. The bracket supports the drive motor 16 and the guide pin.

The drive motor 16 is, for example, a stepping motor provided with rotary encoder, and controlled by a control unit 50, which will be described later.

In an end portion of the bracket, an end of a guide shaft of the translationally driving mechanism 18 is linked and a nut part is provided to link to an end of a ball screw of the translationally driving mechanism 18. Consequently, the bracket is supported movably in the direction approximately parallel to the recording surface of the recording medium substrate by the ball screw and the guide shaft of the translationally driving mechanism 18.

The translationally driving mechanism 18 is provided on a housing of the spin coating apparatus and disposed next to the cup 28. The translationally driving mechanism 18 comprises principal components of a ball screw connected to an output shaft of a drive motor 20 via a coupling and a guide shaft disposed approximately in parallel to the ball screw to guide the bracket.

An end of the ball screw and an end of the guide shaft are supported by bearings 22 provided on the housing of the spin-coating apparatus. The other end of the ball screw is coupled rotatably with a nut part of the bracket, and the other end of the guide shaft is coupled slidably with a guide hole of the bracket.

The drive motor 20 is, for example, a stepping motor provided with a rotary encoder. The drive motor 20 is controlled by a control unit 50, which will be described later. This translationally driving mechanism 18 drives the vertically driving mechanism 14 at a predetermined average velocity of 5.1 mm/sec, for example.

A resist feeding section comprises a pressure tank for storing the resist, a pump 40 for discharging the resist in the pressure tank, a discharge adjusting throttle 38 with a discharge switch for setting a feeding quantity of the resist that is discharged from the pressure tank, and a connecting tube 36 connecting the discharge adjusting throttle 38 to an end of the resist feeding nozzle 10.

The resist, a coating liquid, can be polymethyl methacrylate (PMMA). The resist has a surface tension $\gamma$ of 20 mN/m and a density C of $1.1 \times 10^3$ kg/m$^3$, for example.

The discharge adjusting throttle 38 adjusts the resist feeding quantity to be, for example, about 1 cc per an entire surface of one sheet of substrate. It has been confirmed by the inventor of the present invention that a feeding quantity less than 1 cc causes an increased thickness distribution of the resist layer. The pump 40 is controlled by a discharge quantity control block 54, which will be described later.

An embodiment example of a spin coating apparatus of the invention as shown in FIG. 2 comprises a control unit 50 for controlling operation of the vertically driving mechanism 14, the translationally driving mechanism 18, and the resist feeding section.

The control unit 50 is provided with a memory 50M within the unit, the memory 50M storing: the data of an initial position, a terminal position, and a waiting position of the tip of the resist feeding nozzle 10 with respect to the recording surface of the recording medium substrate 30 corresponding to the characteristics of the feeding resist; the data of a supplying quantity of the resist, the quantity being determined corresponding to an intended film thickness based on a preliminary experiment; and the data of number of revolutions of the recording medium substrate 30 corresponding to the above-mentioned positions of the resist feeding nozzle 10.

The control unit 50 is supplied with signals from a data input block (omitted in the figure), the signals including a spin coating start command signal Si, a spin coating end command signal Sf, and detected pulse signals Sa, Sb, and Sc from the encoders of the drive motors 34, 16, and 20, respectively.

The control unit 50 generates control signals and sends them to a drive control circuit 52 according to the steps 1 through 10 shown in FIG. 4 for forming a resist film with a desired thickness on a carbon protective layer on the recording surface of the recording medium substrate 30. First, in response to the spin coating start command signal Si, a data indicating the initial position is read out from the memory 50M. In accordance with the read out data, control signals are generated and sent to the drive control circuit 52 so as to translate the tip of the resist feeding nozzle 10 from the position (the waiting position depicted by the two-dot chain line in FIG. 2) radially outside of the outer periphery of the recording medium substrate 30 towards the center of the substrate 30 up to the initial position at a predetermined distance A indicated in the enlarged drawing of FIG. 1. The control signal is issued yet to move the tip of the resist feeding nozzle 10 downwards to the initial position at a vertical distance X from the recording surface of the recording medium substrate 30.

The drive control circuit 52 generates driving pulse signals Cb and Cc according to the control signals from the control unit 50 and sends them to the drive motors 16 and 20. In this process, the drive control circuit 52 makes operation to obtain a distance of movement from the waiting position to the initial position based on the detected pulse signals Sb and Sc and when the initial position is reached, stops sending the driving pulse signals Cb and Cc.

The distance A is a radial distance from the center line CL of the resist feeding nozzle 10 at the initial position to the inside surface of the hole 30a of the recording medium substrate 30. The distance X is a vertical distance from the surface of the carbon protective film on the recording surface of the recording medium substrate 30 at the initial position to the tip surface of the resist feeding nozzle 10. The distance A is set in accordance with the following formula (1):

$$A \geq r + X/3 \quad (1)$$

where r is an outer radius of the resist feeding nozzle 10.

The distance X is set, after determining the distance A, with adjustment according to the formula (2):

$$X \leq 2[3r\gamma/(2gC)]^{1/3} \quad (2)$$

where γ is a surface tension, g, the acceleration of gravity, and C, a density.

It is taken into consideration that the thickness of the resist film decreases in the spin coating process due to outward scattering of excessive resist and evaporation of organic solvent component. Thus, the distance X is set so as to finally obtain a desired thickness of the resist film within the value satisfying the formula (2). It is therefore allowed to use a resist feeding nozzle 10 with a rather large radius so as to set the distance X at a relatively large value.

The reason for the distance A and the distance X to be set according to the formulas (1) and (2) is described in the following.

It has been confirmed by the inventor of the present invention that a coating film with a uniform thickness can be formed over an area in the range of the radial distance larger than r+X/3 from the edge of the inner periphery when the vertical distance X between the tip of the resist feeding nozzle 10 and the recording surface of the substrate 30 is set within the critical distance up to which a droplet of the resist does not fall down from the tip of the resist feeding nozzle 10.

A critical distance or diameter within which a droplet of the resin does not fall down from the tip of the resist feeding nozzle 10 is now considered. The outer perimeter R [m] of the tip of the nozzle 10 with a diameter 2 r [m] is R=2 π r. The tension T [N] acting on the resist at the tip of the nozzle 10 is T=2 π r γ, where γ [N/m] is a surface tension of the resist.

Figure 3A:
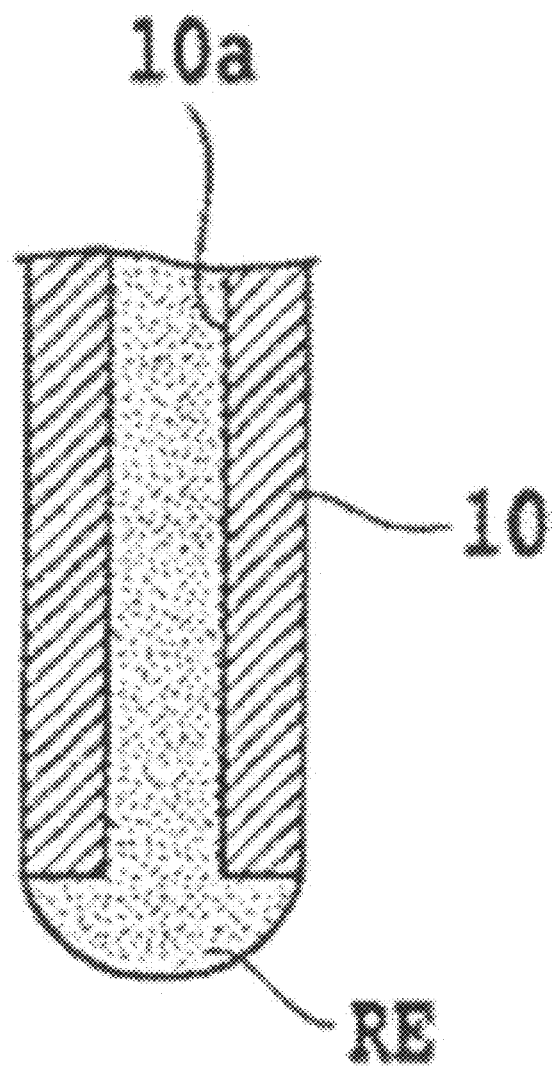
FIGS. 3(A), 3(B); and 3(C) are partial enlarged views illustrating the tip of a resist feeding nozzle and a droplet of a resist in an embodiment example of the spin-coating method according to the invention.
Figure 3B:
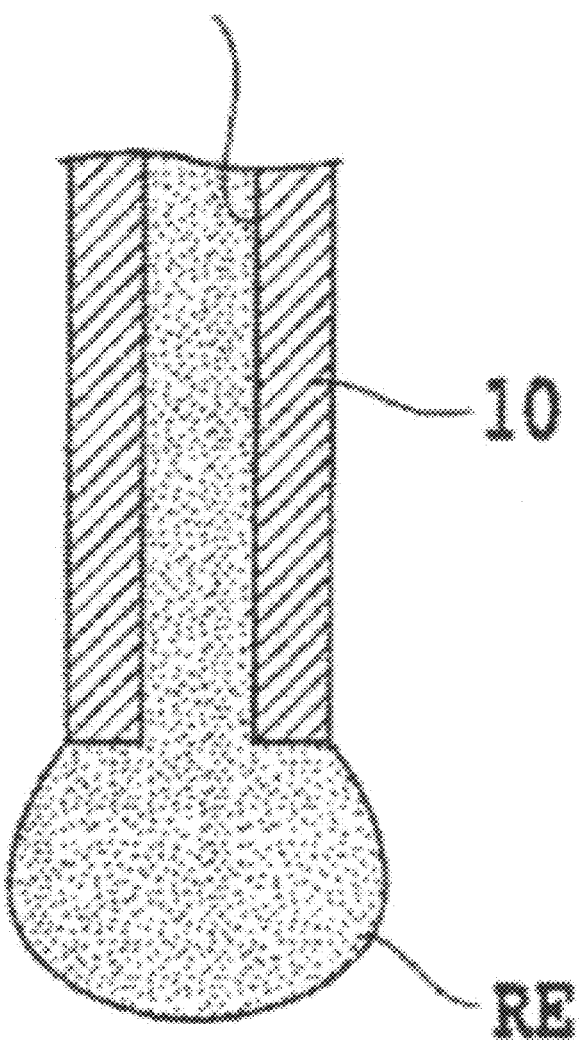

The mass W [kg] of a droplet in balance with the tension T [N] as shown in FIG. 3(B) is W=2 π r γ/g, where g [m/s²] is the acceleration of gravity.

Figure 3C:
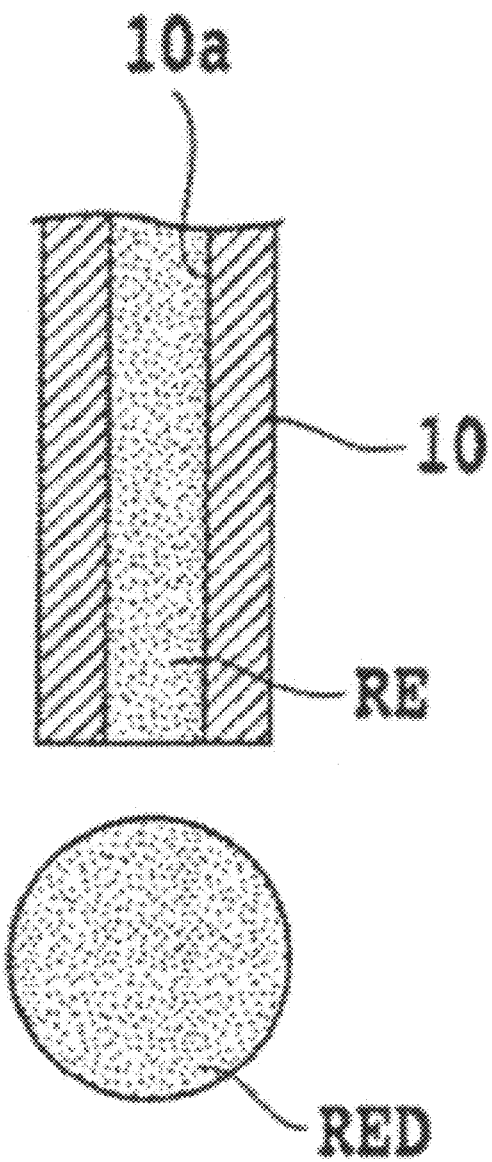

The volume V [m³] of a droplet of the resist of the density C [kg/m³] is V=W/C=2 π r γ/(g C). The radius y [m] of the droplet RED (assumed being a sphere) in FIG. 3(C) just falling down is y=[3 r γ/(2 g C)]^{1/3}, which is derived from the equation V=(4/3)π y³. Therefore, the resist as shown in FIGS. 3(A) and 3(B) does not fall down until the droplet projects out of the tip of the nozzle 10 to the critical distance L=2 y=2 [3 r γ/(2 g C)]^{1/3}.

Measurement was made by the inventor of the present invention for the critical distance of a droplet of the resist within which the droplet does not fall down from the tip of the nozzle 10. In the measurement, the resist was let to go out gradually from the tip of the nozzle 10 fixed to the nozzle holder, and the configuration of the droplet was taken on a CCD camera from the right horizontal direction to measure the configuration of the droplet. It has been shown that the droplet of the resist did not fall down until it projected out of the tip of the nozzle 10 up to a distance of about 1.8 mm, which equals the value calculated from the equation L=2 y=2 [3 r γ/(2 g C)]^{1/3} using the material properties γ=20×10⁻³ [N/m] and C=1.1×10³ [kg/m³] of the resist, and the dimension 2 r=0.51×10⁻³ [m] of the tip of the nozzle. It has also been shown in another example that a droplet of the resist did not fall down until it projected out up to a distance of about 1.5 mm from the tip of a nozzle 10 that had an outer diameter 2 r=0.30×10⁻³ [m].

In the step 2 of FIG. 4, the control unit 50 generates a control signal and sends it to the drive control circuit 52, on start of movement of the tip of the resist feeding nozzle 10 towards the initial position, to rotate the recording medium substrate 30 at a rotating speed in the range of 100 to 500 rpm, preferably at about 250 rpm. The drive control circuit 52 generates a driving pulse signal Ca according to the control signal from the control unit 50 and sends the signal to the drive motor 34 to rotate the recording medium substrate 30.

When the tip of the resist feeding nozzle 10 arrives at the initial position of the distance A=1 mm and the distance X=0.5 mm, for example, the control unit 50, in the step 3 of FIG. 4, generates a control signal and sends it to the discharge quantity control block 54 so as to feed a predetermined quantity of resist in one second. The discharge quantity control block 54, according to the control signal from the control unit 50, sends a driving pulse signal Cp to the pump 40 so as to turn the pump 40 to the on-state. Accordingly, the pump 40 discharges the resist for 1 second.

In this process, the control unit 50, in the step 4 of FIG. 4, generates a control signal and sends it to the drive control circuit 52 so as to start movement of the tip of the resist feeding nozzle 10 from the initial position towards the outer periphery of the recording medium substrate 30 in a predetermined speed while keeping the vertical distance X. The drive control circuit 52 generates a driving pulse signal Cc according to the control signal and sends the pulse signal to the drive motor 20.

Accordingly, the tip of the resist feeding nozzle 10 moves in the radial direction and stops at a position of the center line CL at 1 mm inside from the outermost periphery of the recording medium substrate 30, and stays there for 5 seconds.

Then, the control unit 50, in the steps 6, 7, and 9, generates control signals and sends them to the drive control circuit 52 so as to move the tip of the resist feeding nozzle 10 to the waiting position mentioned previously and raise the rotational speed of the recording medium substrate 30 up to a value in the range of 1,000 to 6,000 rpm, preferably about 3,000 rpm, and keep it at a constant speed. The drive control circuit 52 generates driving pulse signal Ca according to the control signal from the control unit 50 and sends it to the drive motor 34. In this process, the excessive resist is scattered off and the resist layer is made having a uniform thickness. In the step 7 of FIG. 4, the recording medium substrate 30 is rotated for about 6 seconds, and once stopped. Then, in the step 8, the substrate 30 is further rotated for about 26 seconds. After about 26 seconds, in step 9 of FIG. 4, the control unit 50 ceases to send the signal so as to halt the rotation of the recording medium substrate 30. Then, the control unit 50, according to spin coating end command signal Sf, leave the recording medium substrate 30 for about 27 seconds as it is. Thus, formation of the resist layer is completed.

Figure 5:
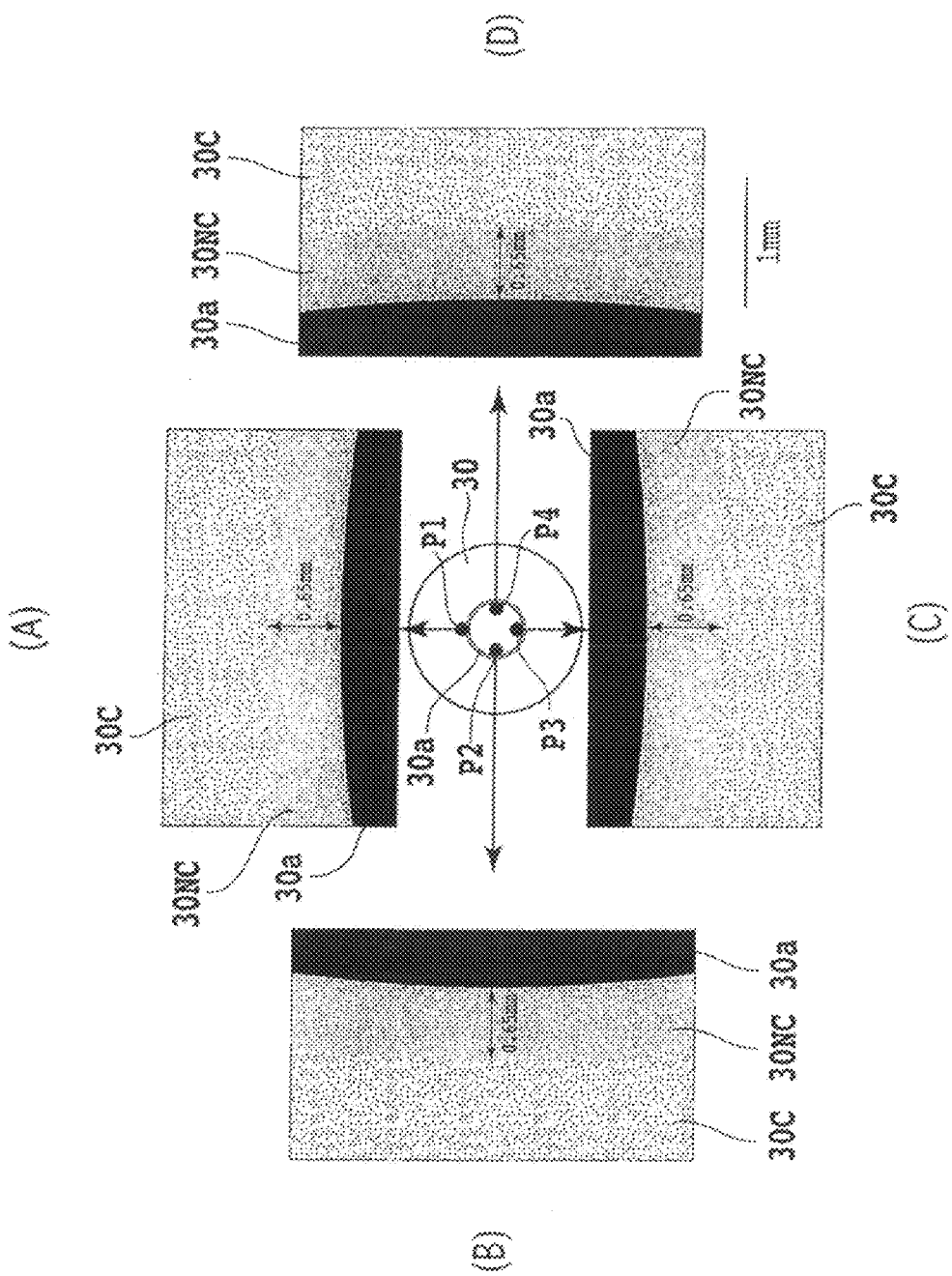
FIG. 5 shows partly enlarged view of a resist layer at four positions of a recording medium substrate.
Figure 7A:
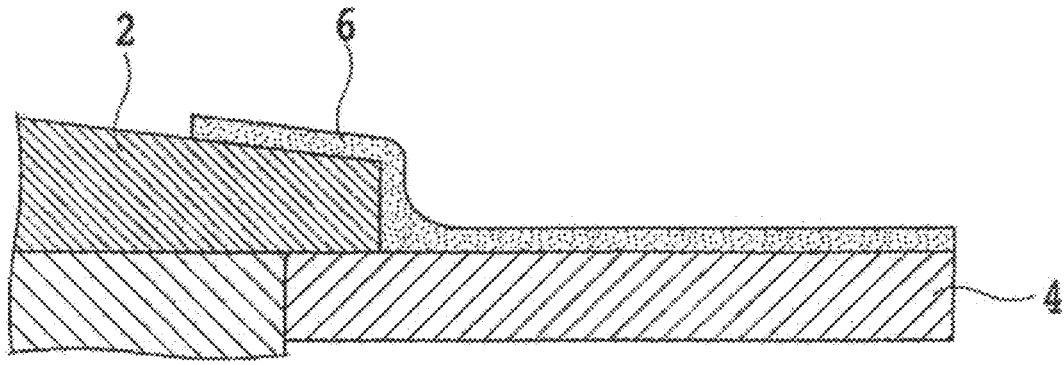
FIGS. 7(A) and 7(B) are partial sectional views illustrating a relation between a rotary disk and a resist layer formed on a substrate in a conventional spin-coating apparatus.
Figure 7B:
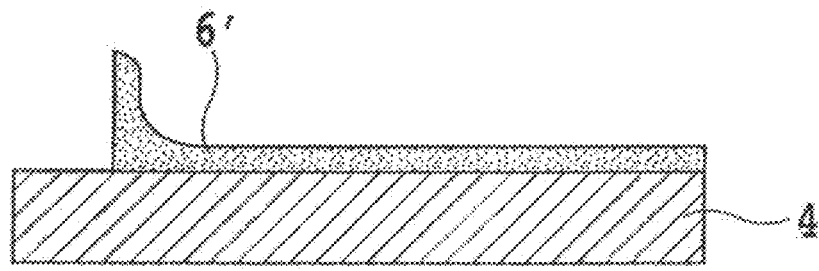

In an experiment conducted by the inventor of the present invention, 1 second after stop of resist feeding, the rotating speed of the recording medium substrate 30 was raised up to 3,000 rpm and kept rotating for 20 seconds, and finished the spin coating process. As shown on the pictures (A), (B), (C), and (D) in FIG. 5, the resist did not spread to the edge of the hole 30a of the recording medium substrate 30, and a resist layer with a uniform thickness was obtained in the area 30C outside the radial position of 0.65 mm from the edge of the hole 30a. As a result, a ring shaped area 30NC without a resist coating was formed around the hole 30a.

The pictures (A), (B), (C), and (D) are enlarged views around the hole 30a of the recording medium substrate 30 at the positions P1, P2, P3, and P4, respectively.

In FIG. 6, results of comparative experiments No. 1 through No. 21 conducted by the inventor of the present invention are shown. In comparative experiments No. 1 through No. 9, a resist feeding nozzle having dimensions different from those of the resist feeding nozzle in the previous description.

The resist feeding nozzle used in the comparative experiments No. 1 through No. 9 had an outer diameter of 0.30 mm and an inner diameter of 0.15 mm. In these comparative experiments, the distance A and the distance X of the initial position were set in the range of 0.3 mm to 1.0 mm and in the range of 0.6 mm to 1.6 mm, respectively. The results of the comparative experiments No. 1 through No. 9 were obtained on the recording medium substrate having a similar configuration to that of the recording medium substrate 30 described previously after completion of a spin coating process, in which 1 second after stop of the resist feeding, the rotating speed of the recording medium substrate was raised to 3,000 rpm and kept rotating at this speed for 20 seconds until the spin coating process was completed.

As clearly shown for the comparative experiments 10 through 21 in FIG. 6, the resist did not fall down in the range of the distance of not larger than about 1.5 mm from the tip of the nozzle in the case of a nozzle outer diameter of 0.30 mm.

The resist feeding nozzle used in the comparative experiments No. 10 through No. 21 as shown in FIG. 6 had an outer diameter of 0.51 mm and an inner diameter of 0.25 mm. In the comparative experiments No. 10 through No. 21, the distance A and the distance X at the initial position were set in the range of 0.3 mm to 1.0 mm, and in the range of 0.6 mm to 1.9 mm, respectively. The results of the comparative experiments No. 10 through No. 21 were obtained on the recording medium substrate having a similar configuration to that of the recording medium substrate 30 described previously after completion of a spin coating process, in which 1 second after stop of the resist feeding, the rotating speed of the recording medium substrate was raised to 3,000 rpm and kept rotating at this speed until the spin coating process was completed.

As clearly shown by the results of the comparative experiments 10 through 21 in FIG. 6, the resist did not fall down in the range of the distance of not larger than about 1.8 mm from the tip of the nozzle in the case of a nozzle outer diameter of 0.51 mm.

It has been thus revealed that the distance A needs to be set at a value in the range of the formula (1): $A \geq r + X/3$. Since the distance X must be set within the range in which the droplet of the resist does not fall down, $X \leq L$ that is equivalent to the formula (2). Thus, the distance X and the distance A are set in the range that satisfies the inequalities (1) and (2).

Since the distance A affects the effective area of the substrate 30, the distance A needs to be as small as possible. Accordingly, it is preferable that the distance A is first fixed, and then the distance X is set corresponding to the value of the distance A.

Observing the overall results given in FIG. 6, it can be stated that the resist did not spread to the edge of the hole of the recording medium substrate when the substrate was approached to the tip of the nozzle within the range of $X \leq 2[3 r\gamma/(2gC)]^{1/3}$, which is the range for avoiding fall down of the droplet of the resist, and a coating film with a uniform thickness was obtained in the region outside the uncoated area that was within 1 mm from the inner edge of the substrate.

In the examples described thus far, the substrate 30 was disposed in parallel to the bottom plane of the cup 28. However, the method of the invention is not limited to such a configuration, but the spin coating method of the invention can be carried out in the arrangement of the substrate 30 vertically with respect to the bottom plane of the cup.

It will be appreciated by those skilled in the art that the invention may be practiced otherwise than as disclosed herein without departing from the scope of the invention.

What is claimed is:

1. A spin coating method for coating a recording medium substrate having a hole in a center thereof, comprising:
    providing a feeding nozzle for feeding a coating liquid onto a recording surface of the recording medium;
    moving a tip of the feeding nozzle to an initial position, the initial position being at a distance X above the recording surface of the recording medium substrate, and at a distance A radially apart from a periphery of the hole of the recording medium substrate; and
    feeding the coating liquid onto the recording surface for a predetermined period of time while rotating the recording medium substrate at a predetermined rotating speed, and moving the tip of the feeding nozzle from the initial position along a radial direction towards an outer periphery of the recording medium substrate while keeping the tip of the feeding nozzle above the recording surface at the distance X; wherein
    X satisfies $X \leq 2[3 r\gamma/(2gC)]^{1/3}$, $\gamma$ and C respectively being a surface tension and a density of the coating liquid, r being an outer radius of the feeding nozzle, and g being the acceleration of gravity, and
    A satisfies $A \geq r + X/3$.

2. The spin coating method of claim 1, wherein
    the coating liquid is a polymethyl methacrylate resist; and
    the recording surface of the recording medium substrate having a carbon protective film formed thereon.

* * * * *